United States Patent
Yoder et al.

(10) Patent No.: US 10,343,736 B2
(45) Date of Patent: Jul. 9, 2019

(54) ASSEMBLIES FOR PIVOTABLY MOUNTING AND/OR REMOVING WHEELS

(71) Applicant: Galen Yoder, Millersburg, IN (US)

(72) Inventors: Galen Yoder, Goshen, IN (US); Mike Schlabach, Goshen, IN (US); Jesse Wingard, Millersburg, IN (US)

(73) Assignee: Galen Yoder, Millersburg, IN (US)

( * ) Notice: Subject to any disclaimer, the term of this patent is extended or adjusted under 35 U.S.C. 154(b) by 67 days.

(21) Appl. No.: 15/482,181

(22) Filed: Apr. 7, 2017

(65) Prior Publication Data
US 2017/0291654 A1 Oct. 12, 2017

Related U.S. Application Data

(60) Provisional application No. 62/320,288, filed on Apr. 8, 2016.

(51) Int. Cl.
*B62D 61/12* (2006.01)
*B60G 17/005* (2006.01)
*B60P 3/32* (2006.01)

(52) U.S. Cl.
CPC ......... *B62D 61/125* (2013.01); *B60G 17/005* (2013.01); *B60G 2202/112* (2013.01); *B60G 2204/47* (2013.01); *B60G 2300/026* (2013.01); *B60G 2300/042* (2013.01); *B60P 3/32* (2013.01)

(58) Field of Classification Search
CPC ............... B62D 61/125; B60G 17/005; B60G 2202/112; B60G 2204/47; B60G 2300/026; B60G 2300/042; B60P 3/32
See application file for complete search history.

(56) References Cited

U.S. PATENT DOCUMENTS

| | | | |
|---|---|---|---|
| 2,018,527 A | 10/1935 | Kerr | |
| 2,886,338 A | 5/1959 | French | |
| 3,182,421 A | 5/1965 | Glass | |
| 3,372,892 A | 3/1968 | May et al. | |
| 4,230,340 A | 10/1980 | Wasservogel | |
| 4,718,875 A | 1/1988 | McKittrick et al. | |
| 4,921,262 A | 5/1990 | Svitak | |
| 5,108,144 A * | 4/1992 | Crowley | B60P 3/32 296/165 |
| 5,364,300 A | 11/1994 | Jow | |
| 6,863,297 B2 | 3/2005 | Shapiro | |
| 8,172,248 B2 * | 5/2012 | Groves | B60P 1/027 280/414.5 |
| 8,696,012 B2 * | 4/2014 | Oyasaeter | B62D 63/061 280/491.1 |

(Continued)

*Primary Examiner* — Joseph M Rocca
*Assistant Examiner* — Marlon A Arce
(74) *Attorney, Agent, or Firm* — Beem Patent Law Firm

(57) ABSTRACT

A pivotable wheel mount assembly may include a mounting bracket and a swing arm coupled to the mounting bracket. The swing arm may be movably coupled to the mounting bracket or the trailer and to a wheel and/or suspension so as to enable the wheel to be rotated from a downward or operational position to a horizontal or stowed position. The assembly may include an actuator support bracket coupled to the mounting bracket and an actuator that provides mechanical assistance moving the wheels between positions. One or more locking mechanisms may be provided to secure the assembly in either the operational position, the stowed position, or both.

19 Claims, 7 Drawing Sheets

(56) References Cited

U.S. PATENT DOCUMENTS

| | | | |
|---|---|---|---|
| 8,727,360 B2* | 5/2014 | Catford | B60G 5/00 |
| | | | 280/43.18 |
| 8,919,792 B2 | 12/2014 | Neuper | |
| 2005/0067799 A1* | 3/2005 | Smith | B60P 1/027 |
| | | | 280/6.151 |
| 2006/0186616 A1 | 8/2006 | Rudiger | |
| 2010/0086386 A1 | 4/2010 | Freeman | |
| 2011/0038699 A1 | 2/2011 | Nguyen | |
| 2015/0042057 A1* | 2/2015 | Karel | B62D 61/12 |
| | | | 280/86.5 |
| 2015/0298519 A1* | 10/2015 | Iliuta | B60P 1/027 |
| | | | 280/6.151 |

\* cited by examiner

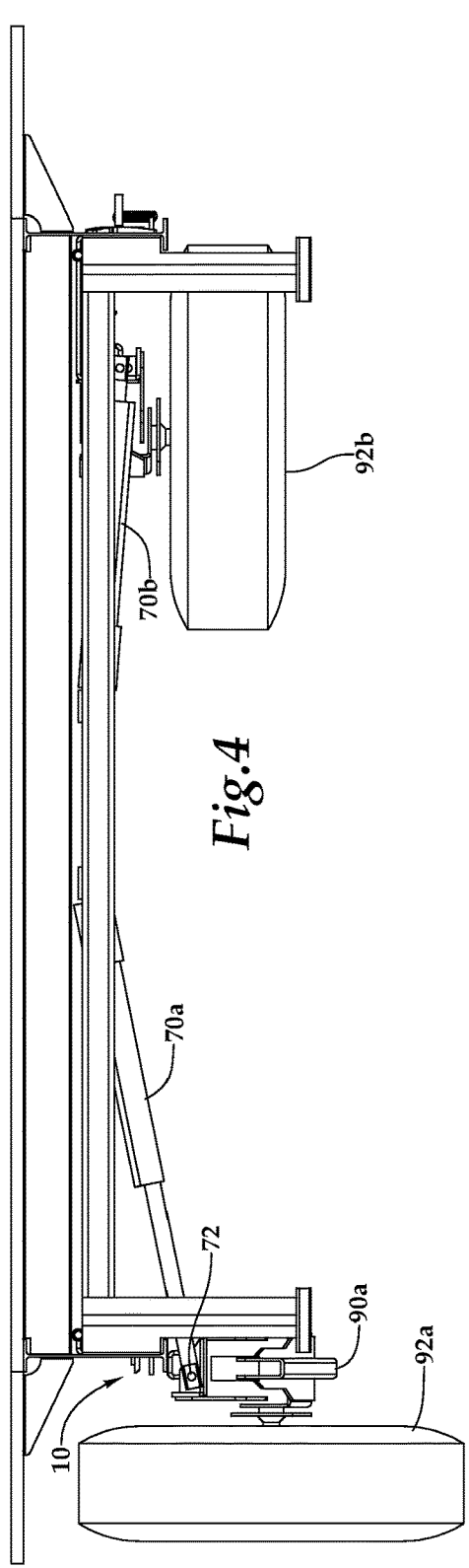
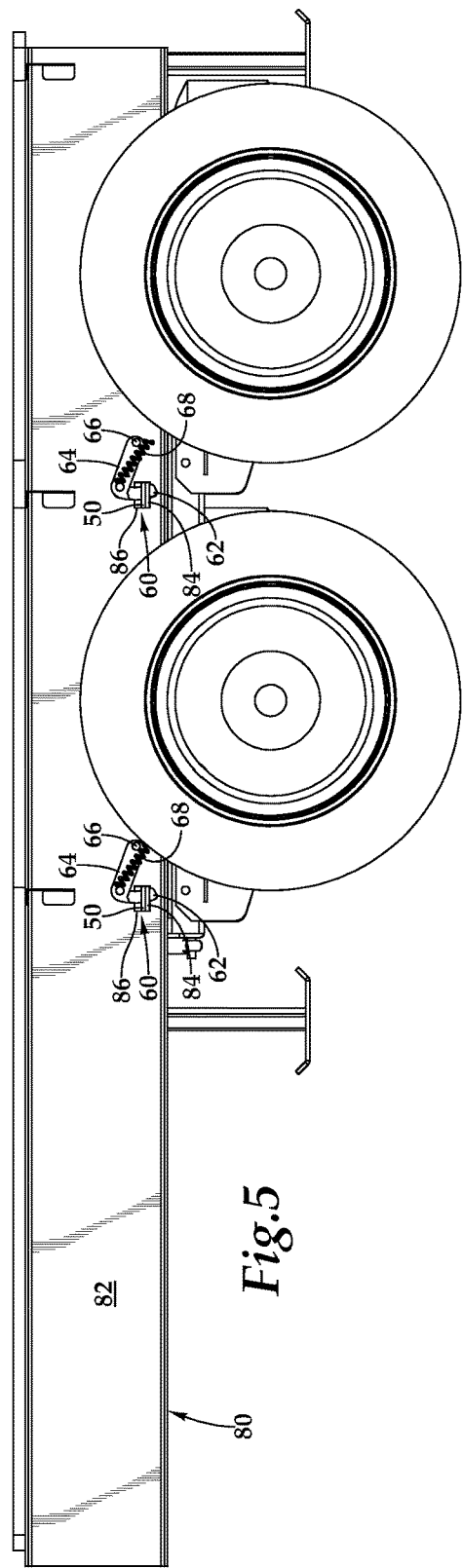

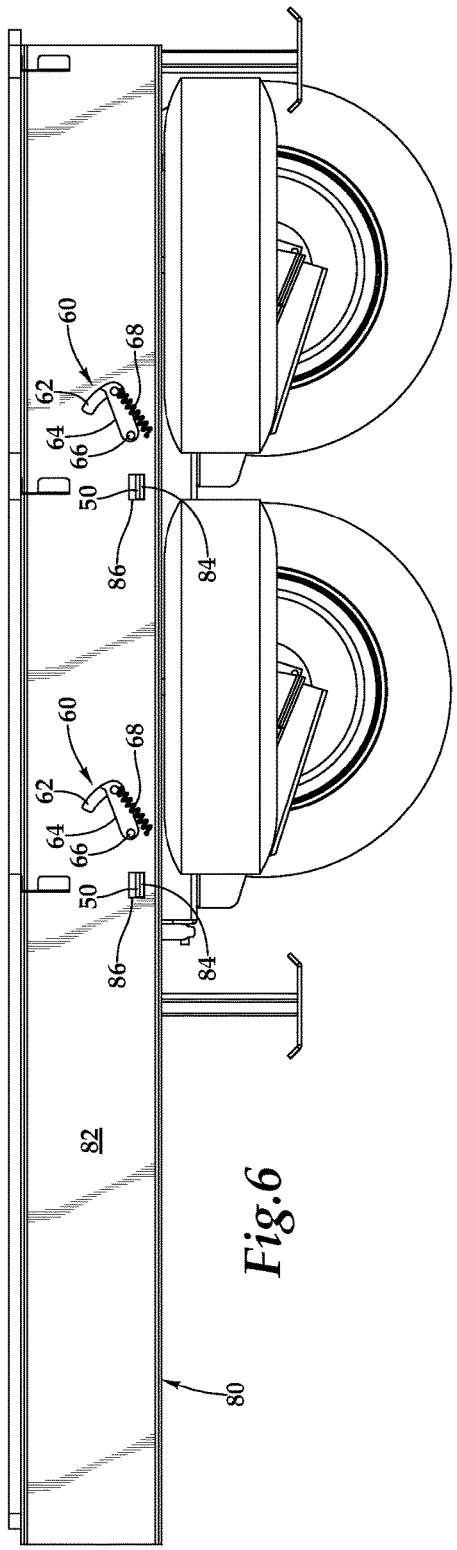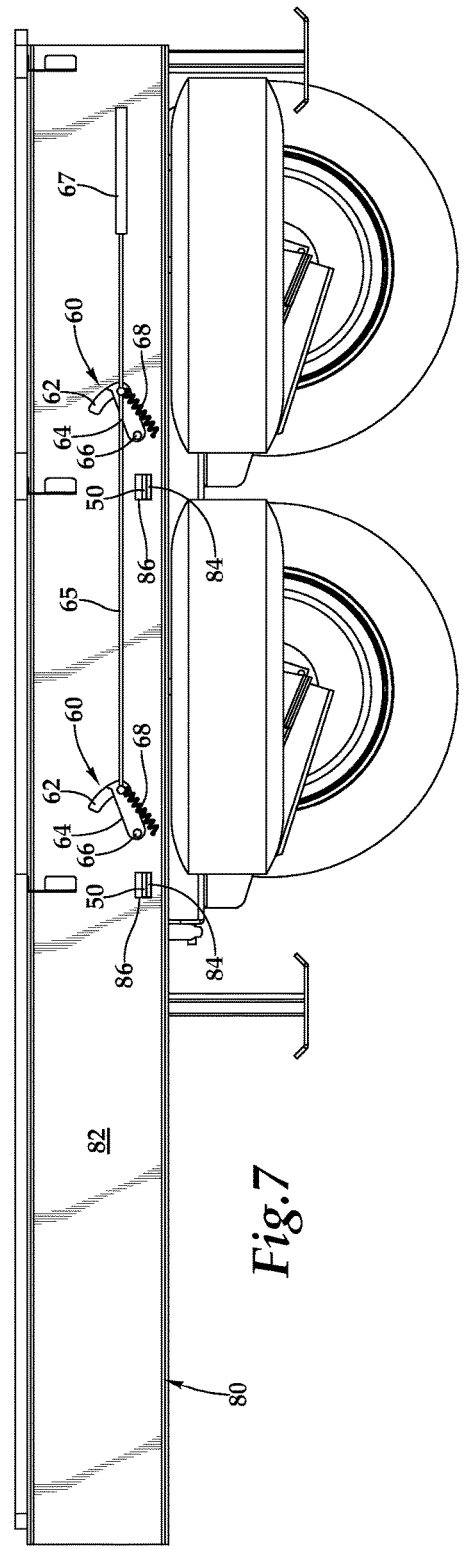

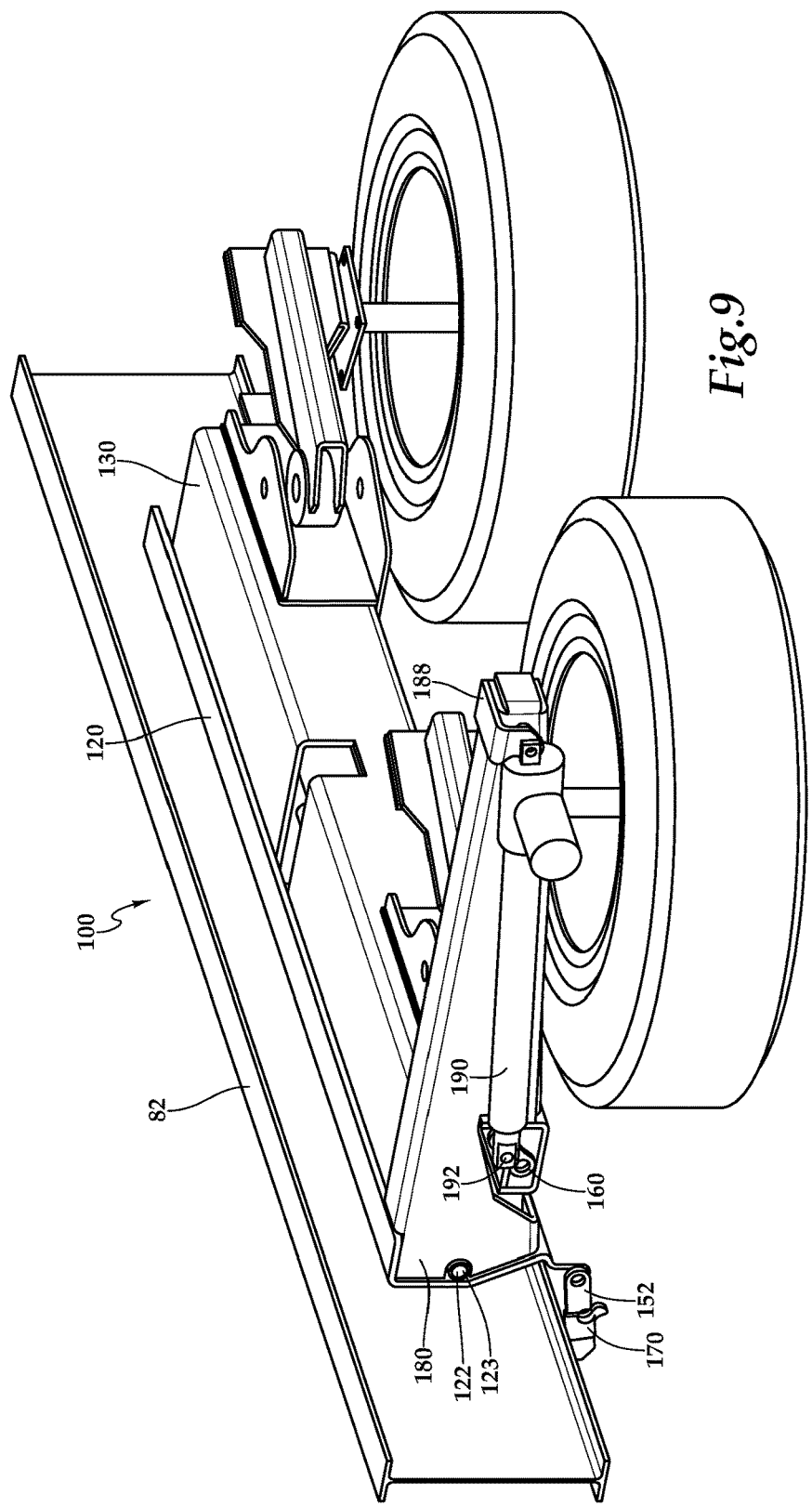

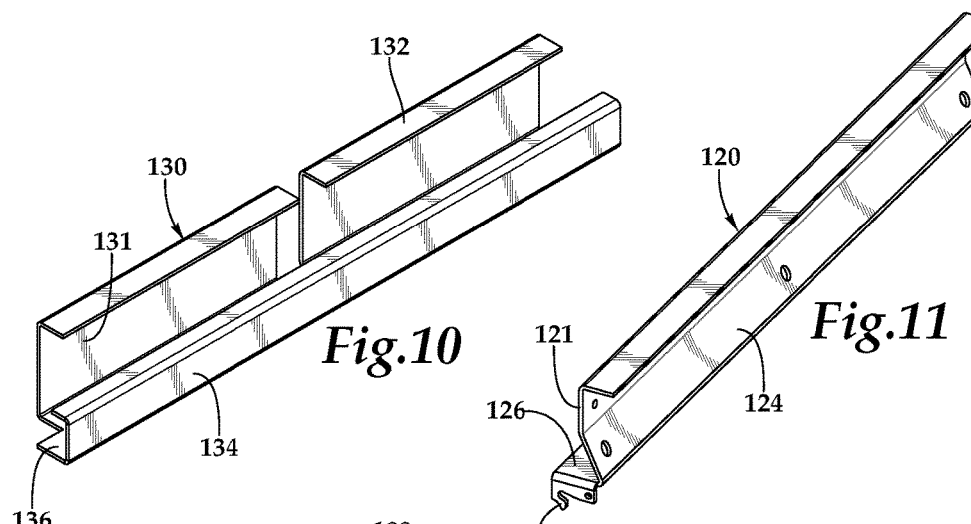
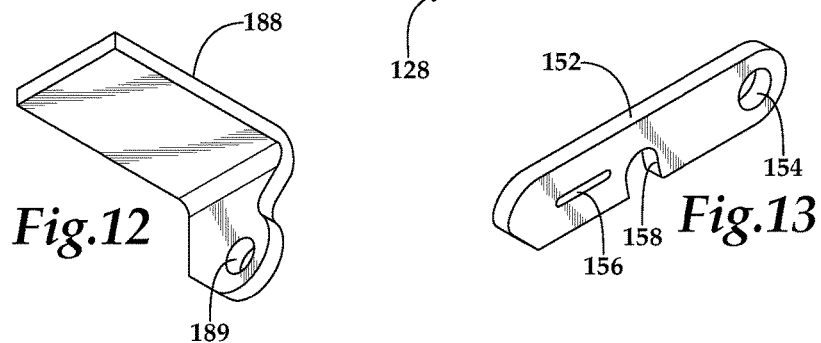
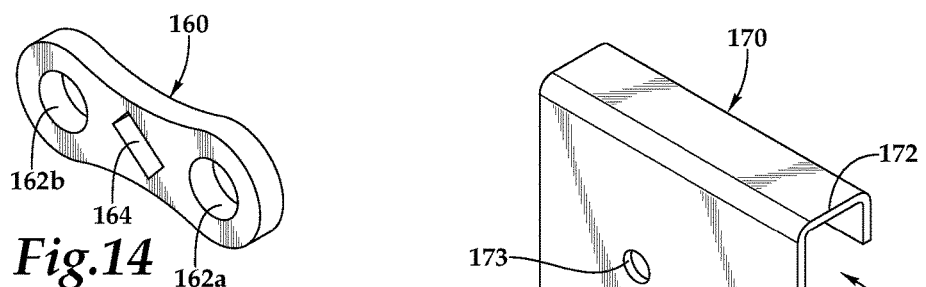
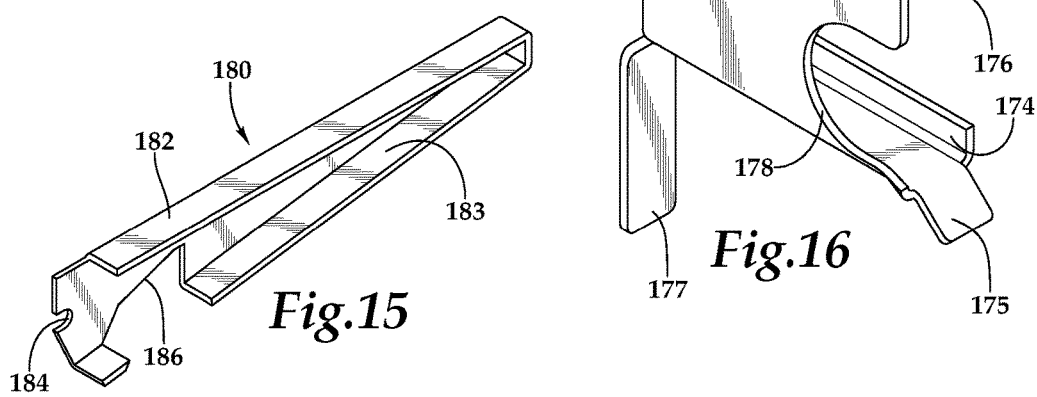

ASSEMBLIES FOR PIVOTABLY MOUNTING AND/OR REMOVING WHEELS

RELATED APPLICATIONS

The present application claims priority under 35 U.S.C. § 119(e) to U.S. Provision Application Ser. No. 62/320,288 filed Apr. 8, 2016, the entirety of which is incorporated by reference as if restated herein.

BACKGROUND OF THE INVENTION

1. Technical Field

The present invention relates to assemblies for mounting wheels and/or suspensions, and more particularly to assemblies for movably and/or removably mounting wheels and/or suspensions to a trailer or the like to increase accessibility by enabling the trailer to be lowered from a typical resting position.

2. Related Art

Owning a recreational vehicle (RV), trailer home or the like (referred to collectively as "mobile homes") can be a rewarding experience. Mobile homes retain the comforts and stability of a home while offering the freedom to relocate at a moments notice. They also can offer several unique experiences as many scenic places, resorts, campgrounds and other types of recreational spaces offer special access for mobile homes. And because mobile homes often cost much less to own and operate than a typical home, they also create the financial flexibility for mobile home owners. For all of these reasons, mobile homes often are an attractive choice for retirees.

While mobile homes offer a variety of benefits and flexibility, it can be difficult for less mobile individuals to enter and exit the unit. For example, a typical mobile home rests between about 2 to 3 feet off the ground to accommodate the large wheels disposed on the trailer. As a result, persons must either climb up and down large steps or setup a ramp to enter or exit the unit. Both of these options can be difficult for elderly or others with physical limitations. In addition, the large wheels of the trailer detract from the overall aesthetics, making the mobile home appear more mobile and less like a home.

A few mechanisms have been created to attempt to address these limitations. For example, drop suspensions sometimes are used to lower a trailer; however these systems typically lower the trailer only about one to three inches. Alternatively, some manufacturers place the wheels outside (rather than underneath) the trailer bed so the trailer bed rests at a lower height. However, this results in decreased ground clearance and a wider trailer footprint, both of which makes transporting the mobile home more difficult. In short, a need has long existed for improved systems and methods for mounting wheels to a trailer.

SUMMARY

A pivotable wheel mount assembly may include a mounting bracket and a swing arm coupled to the mounting bracket. The swing arm may be movably coupled to the mounting bracket or the trailer and to a wheel and/or suspension so as to enable the wheel to be rotated from a downward or operational position to a horizontal or stowed position. The assembly may include an actuator support bracket coupled to the mounting bracket and an actuator that provides mechanical assistance moving the wheels between positions. One or more locking mechanisms may be provided to secure the assembly in either the operational position, the stowed position, or both.

Other systems, methods, features and technical advantages of the invention will be, or will become apparent to one with skill in the art, upon examination of the figures and detailed description. It is intended that all such additional systems, methods, features and technical advantages be included within this summary and be protected by the claims.

BRIEF DESCRIPTION OF THE DRAWINGS

The invention can be better understood with reference to the following drawings and description. The components in the figures are not necessarily to scale, emphasis instead being placed upon illustrating the principles of the invention.

FIG. 4 shows a rear view of an exemplary trailer with exemplary pivotable wheel mount assemblies in a first position and a second;

FIG. 5 shows a side view of an exemplary trailer with an exemplary locking mechanism for use with the exemplary pivotable wheel mount assembly of FIG. 1 in a locked position;

FIG. 6 shows a side view of an exemplary trailer with an exemplary locking mechanism for use with the exemplary pivotable wheel mount assembly of FIG. 1 in an open position;

FIG. 7 shows a side view of an exemplary trailer with another exemplary locking mechanism for use with the exemplary pivotable wheel mount assembly of FIG. 1 in an open position;

FIG. 9 shows a perspective view of the exemplary pivotable wheel mount assembly of FIG. 8 in a second or fully pivoted position;

FIG. 10 shows a perspective view of exemplary swing bracket for use in the exemplary pivotable wheel mount assembly of FIG. 8;

FIG. 11 shows a perspective view of exemplary mounting bracket for use in the exemplary pivotable wheel mount assembly of FIG. 8;

FIG. 12 shows a perspective view of exemplary actuator mounting bracket for use in the exemplary pivotable wheel mount assembly of FIG. 8;

FIG. 13 shows a perspective view of exemplary locking arm mount for use in the exemplary pivotable wheel mount assembly of FIG. 8;

FIG. 14 shows a perspective view of exemplary actuator mount pin support bracket for use in the exemplary pivotable wheel mount assembly of FIG. 8;

FIG. 15 shows a perspective view of exemplary actuator support arm mounting bracket for use in the exemplary pivotable wheel mount assembly of FIG. 8;

FIG. 16 shows a perspective view of exemplary locking latch for use in the exemplary pivotable wheel mount assembly of FIG. 8.

DETAILED DESCRIPTION OF THE PREFERRED EMBODIMENTS

The elements illustrated in the figures interoperate as explained in more detail below. Before setting forth the detailed explanation, however, it is noted that all of the discussion below, regardless of the particular implementation being described, is exemplary in nature, rather than limiting.

Exemplary Wheel Mount Assembly Overview

Figure 1:
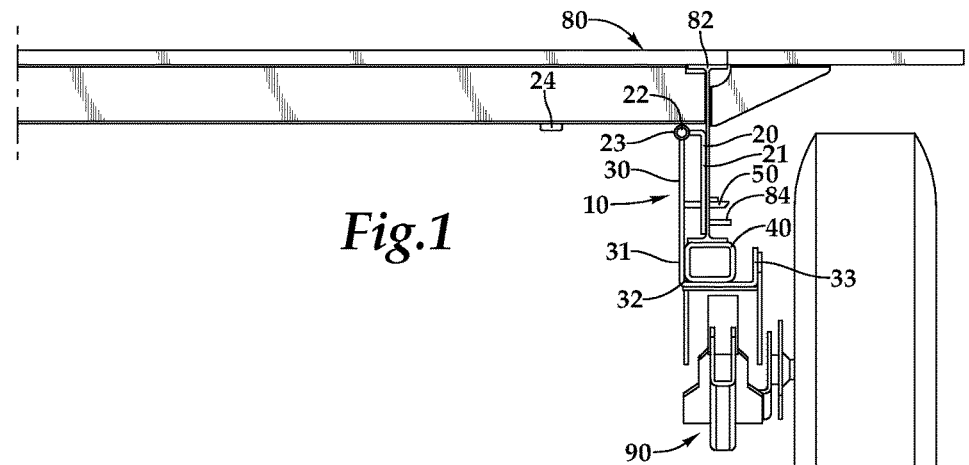
FIG. 1 shows a rear view of an exemplary pivotable wheel mount assembly in a first or operating position.

Referring to the drawings, and initially to FIG. 1, a rear view of an exemplary pivotable wheel mount assembly 10 in a first or operating position is shown. Only relevant portions of the pivotable wheel mount assembly 10 are shown herein for sake of clarity. In the illustrated embodiment, the pivotable wheel mount assembly 10 may include a mounting bracket 20 and a swing arm 30. The swing arm 30 may be coupled to the mounting bracket 20. In the illustrated embodiment, the swing arm 30 is pivotably attached to the mounting bracket by a barrel hinge having a series of interlocking bushings 22 and a rod 23. In some embodiments, the swing arm 30 may be coupled directly to the trailer 80.

Figure 2:
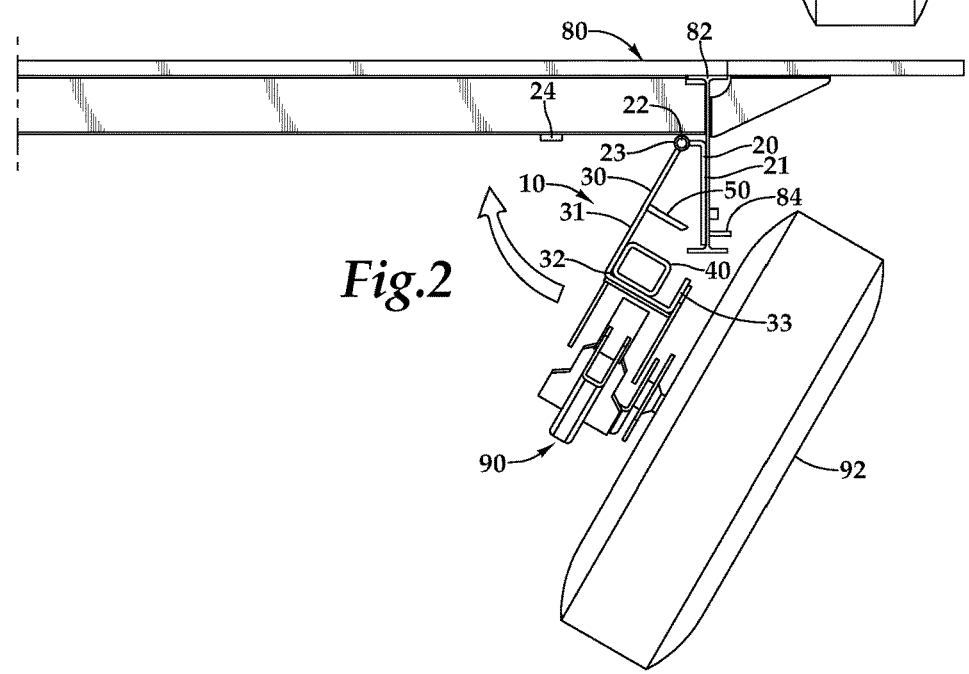
FIG. 2 shows a rear view of the exemplary pivotable wheel mount assembly of FIG. 1 in a transitional position.
Figure 3:
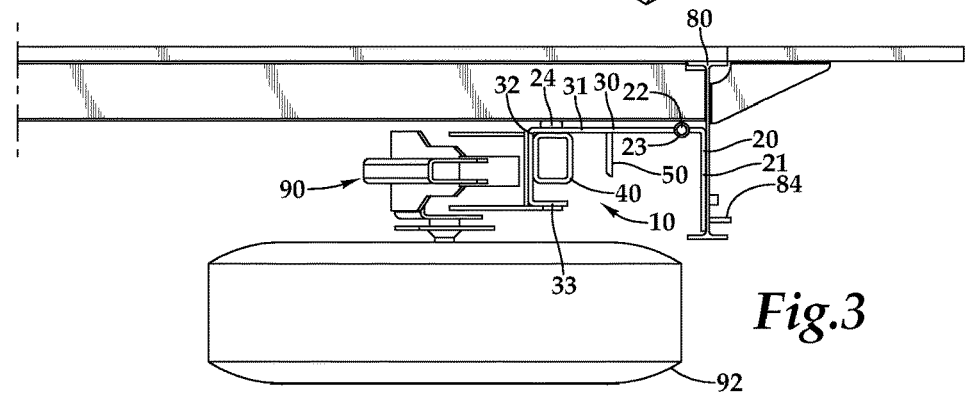
FIG. 3 shows a rear view of the exemplary pivotable wheel mount assembly of FIG. 1 in a second or fully pivoted position.

Referring also to FIGS. 2 and 3, the swing arm 30 may be coupled to a suspension 90 which is connected to a wheel 92 such that, when the swing arm 30 is pivoted about an axis defined by the hinge 22, the wheel 92 is rotated from a downward or operational position to a horizontal or stowed position. Although reference is sometimes made to a single suspension/wheel, mount assemblies 10 may be used in connecting with single wheel assemblies, tandem wheel assemblies, triple wheel assemblies and the like. Exemplary suspensions include spring suspensions such as the AXEL-LESS suspension sold by Timbren Industries, Inc. of Whitby, Ontario Canada and leaf spring suspensions, air suspensions, and the like.

In operation, an operator may position stabilizer jacks under the trailer, (optionally) release the locking mechanism 60 (FIGS. 5-7), rotate the swing arm to a stowed position, and lower the trailer into a desired position via the stabilizing jacks. By rotating the wheel using the wheel mount assembly 10, the trailer may be lowered to any desirable potion, such as between about 6 inches and about 36 inches, depending on the size of the trailer, the size of the wheels and their position relative to the trailer 80. For example, in the embodiment shown in FIG. 4, the wheel 92 may be rotated above the lowest portion of the trailer 80, enabling the trailer to be lowered to the ground if so desired. Optionally, the trailer 80 may provide recesses for allowing the swing arm 30 and the wheel 92 to be rotated into the frame of the trailer 80, allowing the trailer to be lowered even further. As a result, entry and exit of the mobile home is facilitated, which may allow greater access for persons of limited mobility. In addition, the aesthetics of the mobile may be improved because the wheels may be obscured from view.

Figure 8:
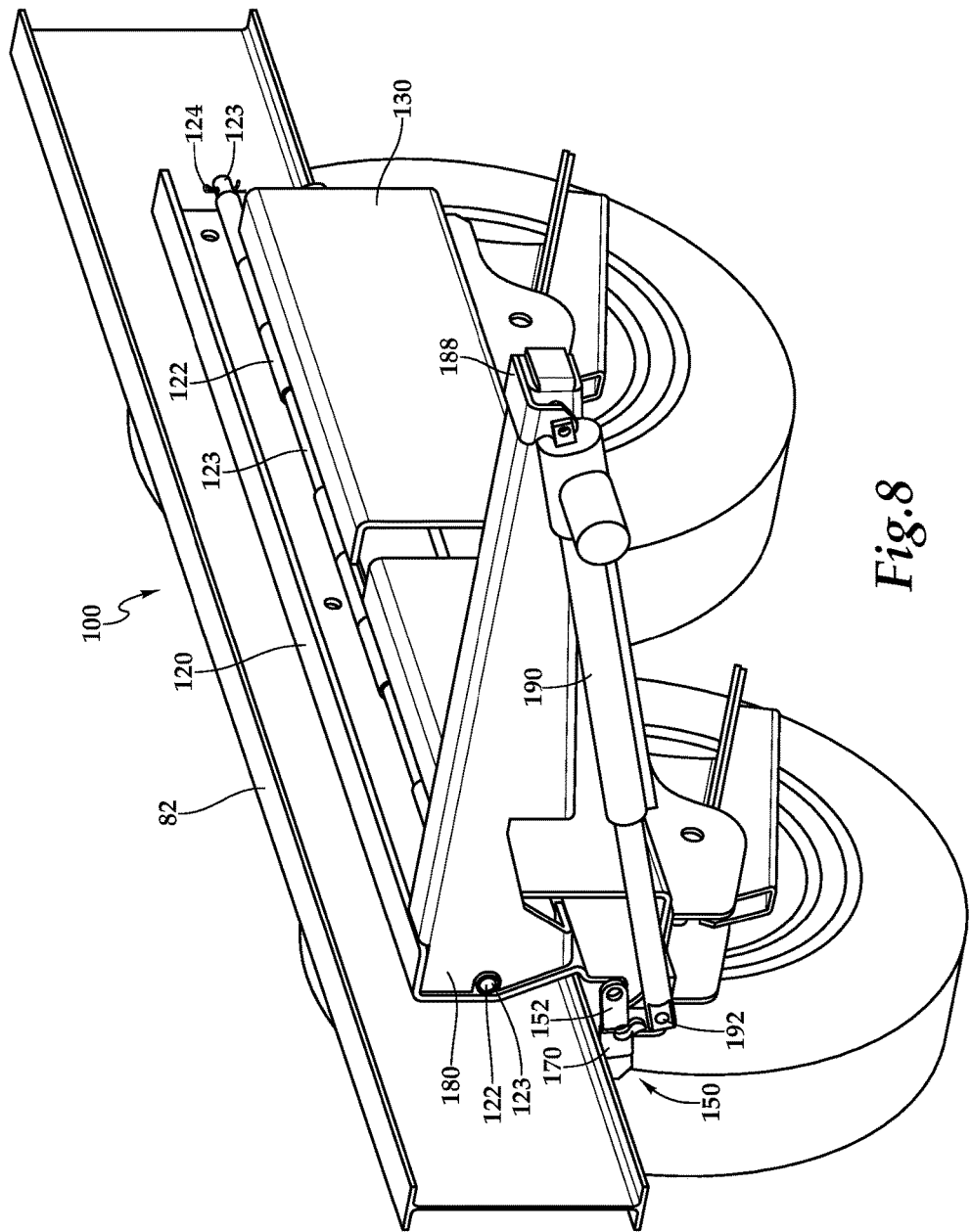
FIG. 8 shows a perspective view of another exemplary pivotable wheel mount assembly in a first or operating position.

In some embodiments, the rod 23 may be removably attached to the hinge, for example, via a pin locking mechanism (shown in FIG. 8). Because the rod 23 is removably attached to the hinge 22, detachment of the rod 23 may allow an operator to detach the swing arm 30 from the mount bracket 20, thereby making the suspension 90 and/or wheel 92 easily removable from the trailer 80. In such embodiments, the trailer may be lowered to the ground if so desired. In addition, the removed suspension 90 and/or wheels 92 may be stored in a controlled environment, extending the life of the components.

In some embodiments, there may be no restrictions on the angle of rotation of the swing arm 30. For example, the swing arm 30 may rotated between about 45° and about 150° from the operational position, preferably between 60° and about 120° from the operational position, even more preferably between about 75° and about 105° from the operational position, even more preferably between about 85° and about 95° from the operational position and in some embodiments about 90° from the operational position. Optionally, a stop 24 may be provided to restrict the rotation of the swing arm 30. In some embodiments, the swing arm 30 may be coupled to the stop 24, such as by a bolt or other method.

The swing arm 30 may be manually rotated from the vertical or operational position to the horizontal or stowed position. Referring also to FIG. 4, an actuator 70 may be provided to provide mechanical assistance to rotate the swing arm 30 from the vertical or operational position to the horizontal or stowed position. For example, the actuator 70 may be an electrical actuator, a hydraulic actuator, an electric motor with a gear or the like. In some embodiments, an actuator arm 72 may be coupled to the swing arm 30, such as by a pin or bolt.

The components of the assembly 10, such as the mounting bracket 20 and the swing arm 30, may be made from a variety of materials suitable for withstanding the forces that may be applied by the weight of the suspension, wheel and/or trailer load. For example, a typical suspension and wheel may weigh between about 25 lbs and about 500 lbs, and a trailer may have a load weighing between about 1,000 lbs and about 40,000 lbs or more. These weights can potentially result in great forces being applied to the various components of the assembly 10. In some embodiments, the components of the assembly 10 may be made from mild steel, such as 1026 or 1036 mild steel. Alternatively or additionally, the components of the assembly 10 may be made of galvanized steel, galvanite steel, or other suitable materials.

Different components of the assembly 10 may be made of different materials, or all components may be made of the same material. For example, the mounting bracket 20 may be made of mild steel 1026 and the lock arm 64 (described below) may be made of AR 300 steel. In some embodiments, different parts of the same component may be made of different materials.

Mounting Bracket

The mounting bracket 20 may include a mounting portion 21 that may be coupled to the trailer 80, for example, by welding or bolting the mounting bracket 20 to the trailer 80. In the illustrated embodiment, the mounting bracket 20 is welded to an inner surface of an I-beam 82. Alternatively, the mounting bracket may be attached to the outer surface of the I-beam 82 or another part of the trailer 80. Other methods of coupling the mounting bracket 20 to the trailer 80 also may be used.

The height of the mounting portion 21 may corresponding to the height of the surface of the I-beam 82 to which the mounting bracket 20 is coupled. For example, the mounting bracket 20 may have a height between about 50% to about 100% of the to the height of the surface of the I-beam 82 to which the mounting bracket 20 is coupled and preferably between about 70% to about 100% of the to the height of the surface of the I-beam 82 to which the mounting bracket 20 is coupled. For example, the height of the I-beam 82 may be between about 4 inches and about 12 inches. For such I-beams 82, the corresponding height of the mounting portion 21 may be between about 2 inches and about 12 inches.

Swing Arm

The swing arm 30 may be movably coupled to the mounting bracket 20 or the trailer 80 so as to enable the wheel 92 to be rotated from a downward or operational position to a horizontal or stowed position. In the embodiment illustrated in FIG. 1, the swing arm 30 has a "J" shape comprising a swing portion 31, a lower portion 32 and an outer portion 33. Other shapes also may be used. The swing portion 31 may be coupled to the hinge 22 and may be dimensioned to align with the desired height of the suspension 90 and/or wheel 92. The lower portion 32 may be dimensioned to accommodate the width of the I-beam 82 or other component of the trailer 80 and to align with the desired horizontal placement of the suspension 90 and/or wheel 92. The outer portion 33 may provide a mounting surface to which the suspension 90 and/or wheel 92 may be coupled. Alternatively, or additionally, the suspension 90 and/or wheel 92 may be coupled to the lower portion 32, the outer portion 30, or both.

Optionally, a support block 40 may be coupled to the swing arm 30 to support the weight of the trailer 80. When the assembly is in the operational position, the support block 40 may rest directly under the I-beam 82. Preferably, the support block 40 is at least as wide as the I-beam 82, such as between about 1¼ inches and about 6 inches. The support block 40 may be coupled to any of the components of the swing arm 30. In the illustrated embodiment, the support block 40 is coupled to the lower portion 32 and the swing portion 31. Alternatively, or additionally, the support block 40 may be integrated into the other components of the assembly 10, such as via a direct linkage between the swing portion 31 and the outer portion 33. Other configurations also may be used.

Locking Mechanism

Referring also to FIGS. 5-7, the assembly 10 may include a locking mechanism 60 to secure the assembly 10 in the vertical or operational position. Alternatively, or additionally, locking mechanism 60 or another locking mechanism may also be used to secure the assembly in the stowed position. In the illustrated embodiment, the locking mechanism 60 may include a lock arm 64 pivotably attached to the I-beam 82 via a pivot 66. The lock arm 64 may include a finger 62 that engages an aperture in a tongue 50 that may be coupled to the swing arm 30.

When the assembly is in the operational position, the tongue 50 may protrude through an aperture 86 in the I-beam 82 such that an aperture in the tongue 50 is exposed and the finger 62 of the lock arm 64 may be secured therein. For example, the finger 62 may be wedged so as to frictionally engage the aperture in tongue 50. The lock arm 64 may be coupled by spring 68 so as to bias the lock arm in the locked potion, the open position, or both depending on the position of the lock arm 64. Optionally, an additional brace 84 may be provided on the I-beam 82 through which the finger 62 may protrude to provide additional stabilization of the locking mechanism 60.

Referring to FIG. 7, an optional actuator 67 may be provided to assist in the locking (as shown in FIG. 5) and/or unlocking (as shown in FIG. 6) of the locking mechanism 60. For example, an actuator arm 65 may be attached to each of a plurality of lock arms 60 to enable push button control of the locking mechanisms. In some embodiments, components such as contact switches may be provided to detect whether the locking mechanism 60 is in a locked position or an unlocked position Other Exemplary Embodiments Other exemplary embodiments of a wheel mount assembly 100 and components thereof are shown in FIGS. 8-17. In the illustrated embodiment, the pivotable wheel mount assembly 100 may include a mounting bracket 120 and a swing arm 130. The swing arm 130 may be coupled to the mounting bracket 20. In the illustrated embodiment, the swing arm 130 is pivotably attached to the mounting bracket by a set of barrel hinges each having a series of interlocking bushings 122 and a rod 123. Alternatively, or additionally, the swing arm 130 may be coupled directly to the trailer 80.

As shown in FIGS. 8 and 9, the swing arm 130 may be coupled to a tandem suspension 90 which is connected to two wheels 92 such that, when the swing arm 130 is pivoted about an axis defined by the hinges 122, the wheels 92 are rotated from a downward or operational position to an up or stowed position. In addition, the rod 123 may be removably attached to the hinge, for example, via a pin locking mechanism 124. Because the rod 123 is removably attached to the hinges 122, detachment of the rod 123 may allow an operator to detach the swing arm 130 from the mount bracket 120, thereby making the suspension 90 and/or wheel 92 easily removable from the trailer 80.

Figure 17:
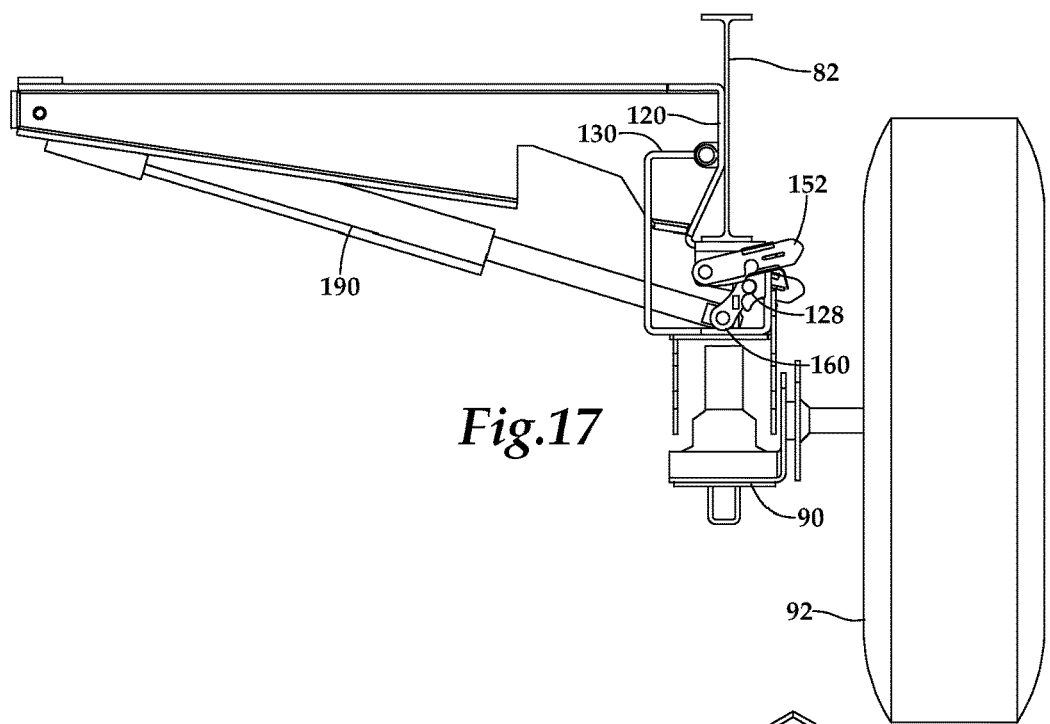
FIGS. 17 and 18 show perspective views of an exemplary locking mechanism for use in the exemplary pivotable wheel mount assembly of FIG. 8.
Figure 18:
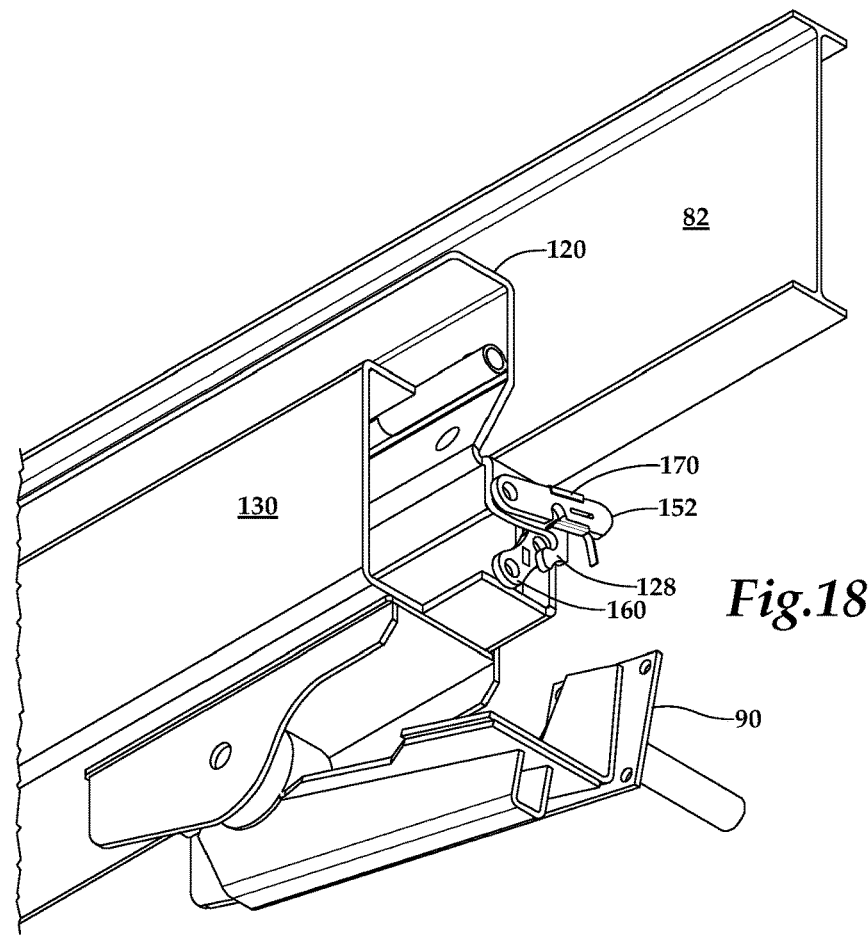

An exemplary swing arm 130 is shown in FIG. 10. In the illustrated embodiment, the swing arm 130 may be movably coupled to the mounting bracket 120 or the trailer 80 at an upper lip 132 so as to enable the wheel 92 to be rotated from a downward or operational position to a horizontal or stowed position. The swing arm 130 also may include a base 136 and a lower lip 134. The base 136 may be dimensioned to accommodate the width of the I-beam 82 or other component of the trailer 80 and to align with the desired horizontal placement of the suspension 90 and/or wheel 92. The actuator arm 192 may be mounted to the base 136, the lower lip 134, or both. In the illustrated embodiment, the actuator arm 192 may be coupled to an actuator mount pin support bracket 160 (FIG. 14) that is pinned or bolted to the actuator arm 192 on the one hand, and the lower lip 134 on the other hand via apertures 162a and 162b, as shown in FIGS. 17 and 18.

An exemplary mounting bracket 120 is shown in FIG. 11. The mounting bracket 120 may include a mounting portion 121 that may be coupled to the trailer 80, for example, by bolting the mounting portion 121 to the I-beam 82 of the trailer 80. In the illustrated embodiment, the mounting bracket 120 also may include a support portion 126 that nestles against and supports the bottom of the I-beam 82. Preferably, the support portion 126 is at least as wide as the I-beam 82, such as between about 1¼ inches and about 6 inches. An angled portion 124 may be provided to couple the mounting portion 121 to the support portion 126. The mounting bracket 120 also may include a lock engagement portion 128 for engaging a locking mechanism 150, as described below.

An actuator support arm 180 may be provided to support an actuator 190 that provides mechanical assistance to rotate the swing arm 30 from the vertical or operational position to the horizontal or stowed position. The actuator support arm 180 may be coupled to the mounting bracket 120, for example, by welding the actuator support arm 180 to the mounting bracket 120. The use of an actuator support arm allows the entire assembly to be self-contained, i.e., utilized as an add-on unit that may be operable with virtually any trailer. The actuator support arm may include an upper lip 182 and lower lip 183 that provide structural rigidity. The actuator support arm 180 also may include a recessed portions 184 and 186 for accommodating the hinges 122 and receiving a portion of the swing arm 130 when the assembly is moved to the stowed position, respectively. Optionally, an actuator support bracket 188 may be coupled to the actuator support arm 180 and the actuator 190 to provide additional structural rigidity.

The locking mechanism 150 (shown in greater detail in FIGS. 17 and 18) may allow for the manual locking of the wheel assembly in the operational position. In the illustrated embodiment, the locking mechanism includes a locking arm mount 152 (FIG. 13) and a locking latch 170 (FIG. 16). The locking arm 152 may be pinned to the mounting bracket via a pin through an aperture 154. The recessed portion 158 may fit around another pin connected to the swing arm 130. To secure the locking arm 152 in place, the latch 170, which may include a channel 176 defined by an upper lip 172 and lower lip 174, may be slide over the locking arm 152. Once the recessed portion 178 fully engages the pin, the latch may be secured in place via a pin, spring, bolt or other mechanism. Portions 175 and 177 may provide surfaces to assist in the handling of the latch 170.

Alternatively, or additionally, locking mechanism 150 may comprise a manual pin locking mechanism, an automatic lever, lock-in, lock-out locking mechanism, a slide-up, slide-down locking mechanism or any other locking mechanism.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A wheel mount assembly for mounting a wheel assembly including at least one wheel on a trailer for a mobile home, the trailer including at least one I-beam, the wheel mount assembly comprising:
a mounting bracket fixedly coupled to an inner surface of the I-beam of the trailer;
a swing arm pivotably coupled to the mounting bracket, the swing arm coupled to the wheel assembly so that movement of the swing arm causes the wheel assembly to be rotated from a substantially vertical operational position to a non-vertical stowed position; and
an actuator for mechanically rotating the swing arm between the operational position and the stowed position, the actuator pivotably coupled to the swing arm and pivotably coupled to the trailer, the actuator causing the swing arm to rotate upward and inward towards an underside of the trailer when rotating from the operational position to the stowed position.

2. The wheel mount assembly of claim 1 further comprising a suspension coupled to the swing arm and the wheel assembly.

3. The wheel mount assembly of claim 2, where the suspension is a leaf spring suspension.

4. The wheel mount assembly of claim 1 where the wheel assembly is a tandem wheel assembly.

5. The wheel mount assembly of claim 1, further comprising a locking mechanism operable to secure the assembly in either the operational position, the stowed position, or both.

6. The wheel mount assembly of claim 1, where, in the stowed position, the wheel is rotated completely above the lowest portion of the trailer.

7. The wheel mount assembly of claim 1, where the swing arm pivots between about 75° and about 105° from the operational position to the stowed position.

8. The wheel mount assembly of claim 1, where the actuator is one selected from the group comprising an electrical actuator, a hydraulic actuator, and an electric motor with a gear.

9. The wheel mount assembly of claim 1, where the swing arm is removably coupled to the mounting bracket by a barrel hinge, the barrel hinge including a removable rod.

10. A wheel mount assembly for mounting a tandem wheel assembly on a trailer for a mobile home, the trailer including at least one I-beam, the wheel mount assembly comprising:
a mounting bracket coupled to an inner surface of the I-beam of the trailer;
a spring suspension system coupled to the tandem wheel assembly;
a swing arm coupled to the suspension, the swing arm pivotably coupled to the mounting bracket so that movement of the swing arm causes the tandem wheel assembly to be rotated from a substantially vertical operational position to a non-vertical stowed position; and
an actuator for mechanically rotating the swing arm.

11. The wheel mount assembly of claim 10, where the swing arm is removably coupled to the mounting bracket by a barrel hinge, the barrel hinge including a removable rod.

12. The wheel mount assembly of claim 10, further comprising a locking mechanism operable to secure the tandem wheel assembly in either the operational position, the stowed position, or both.

13. The wheel mount assembly of claim 10, where the actuator includes an actuator arm that is coupled to the mounting bracket and the swing arm.

14. The wheel mount assembly of claim 10, where the actuator is one selected from the group comprising an electrical actuator, a hydraulic actuator, and an electric motor with a gear.

15. The wheel mount assembly of claim 10, where the swing arm pivots between about 75° and about 105° from the operational position to the stowed position.

16. A wheel mount assembly for mounting a tandem wheel assembly on a trailer for a mobile home, the trailer including at least one I-beam, the wheel mount assembly comprising:
a mounting bracket fixedly coupled to an inner surface of the I-beam of the trailer;
a spring suspension system coupled to the tandem wheel assembly;
a swing arm coupled to the suspension, the swing arm pivotably coupled to the mounting bracket so that movement of the swing arm causes the tandem wheel assembly to be rotated from a substantially vertical operational position to a substantially horizontal stowed position;
an actuator for mechanically rotating the swing arm, the actuator pivotably coupled to the swing arm and pivotably coupled to the trailer, the actuator causing the swing arm to rotate upward and inward towards an underside of the trailer when rotating from the operational position to the stowed position; and a locking mechanism operable to secure the tandem wheel assembly in either the operational position, the stowed position, or both.

17. The wheel mount assembly of claim 16, where the swing arm is removably coupled to the mounting bracket by a barrel hinge, the barrel hinge including a removable rod.

18. The wheel mount assembly of claim 16, where the actuator is one selected from the group comprising an electrical actuator, a hydraulic actuator, and an electric motor with a gear.

19. The wheel mount assembly of claim 18, where, in the stowed position, the wheel is rotated completely above the lowest portion of the trailer.

* * * * *